(12) United States Patent
Kubo

(10) Patent No.: US 10,009,902 B2
(45) Date of Patent: Jun. 26, 2018

(54) DEVICE, METHOD AND SYSTEM FOR WIRELESS COMMUNICATION ON A CHANNEL SELECTED FROM AN AVAILABLE-CHANNEL LIST

(71) Applicant: Oki Electric Industry Co., Ltd., Tokyo (JP)

(72) Inventor: Yuki Kubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 181 days.

(21) Appl. No.: 14/547,905

(22) Filed: Nov. 19, 2014

(65) Prior Publication Data
US 2015/0181619 A1 Jun. 25, 2015

(30) Foreign Application Priority Data
Dec. 24, 2013 (JP) ................................. 2013-266004

(51) Int. Cl.
*H04W 72/12* (2009.01)
*H04W 72/06* (2009.01)

(52) U.S. Cl.
CPC .................................. *H04W 72/06* (2013.01)

(58) Field of Classification Search
CPC ............. H04W 72/1257; H04W 28/06; H04W 72/0446; H04W 84/18; H04L 1/1867
USPC ......................................... 370/256, 329, 338
See application file for complete search history.

(56) References Cited

U.S. PATENT DOCUMENTS

| | | | | |
|---|---|---|---|---|
| 4,409,687 A * | 10/1983 | Berti | ..................... | H04W 84/08 340/7.46 |
| 6,977,913 B1 * | 12/2005 | Ishii | ..................... | H04W 72/02 370/329 |
| 2009/0067354 A1 * | 3/2009 | Gao | ..................... | H04W 72/085 370/310 |
| 2009/0290599 A1 * | 11/2009 | Taki | ..................... | H04L 12/4633 370/474 |
| 2010/0056170 A1 * | 3/2010 | Lindoff | ................. | H04L 1/0026 455/452.1 |

(Continued)

OTHER PUBLICATIONS

Yosuke Tanigawa, et al., "Multi-Channel MAC Protocol Aggressive Use of Vacant Resources,"• Journal of IEICE (Institute of Electronics, Information and Communication Engineers) B, vol. J92-B, No. 1, IEICE, published on Jan. 1, 2009, pp. 196-206.

Primary Examiner — Maharishi Khirodhar
Assistant Examiner — Natali N Pascual Peguero
(74) Attorney, Agent, or Firm — Rabin & Berdo, P.C.

(57) ABSTRACT

In a wireless communication system managing wireless communication channels, a wireless communication device includes a radio unit communicable by switching to select any one of wireless communication channels, a channel list storage storing therein a list of the channels, a channel transmission controller controlling the radio unit to transmit a packet while switching a channel on the basis of the list, a channel search transmission controller controlling the radio unit to transmit the packet while switching the channel on the basis of the list until the packet is successfully transmitted, and a transmission control selector selecting either the channel transmission controller or the channel search transmission controller on the basis of a content of the packet of a transmission target for transmission control.

11 Claims, 10 Drawing Sheets

(56) References Cited

U.S. PATENT DOCUMENTS

2010/0099404 A1* 4/2010 Khoo .................... H04W 48/16
455/433
2013/0165112 A1* 6/2013 Gopalsamy ............. H04W 8/02
455/432.1

* cited by examiner

| CHANNEL |
|---|
| Ch1 |
| Ch2 |
| Ch3 |

FIG. 6

| ADDRESS | CHANNEL |
|---------|---------|
| Ad1 | Ch2 |
| Ad2 | Ch3 |

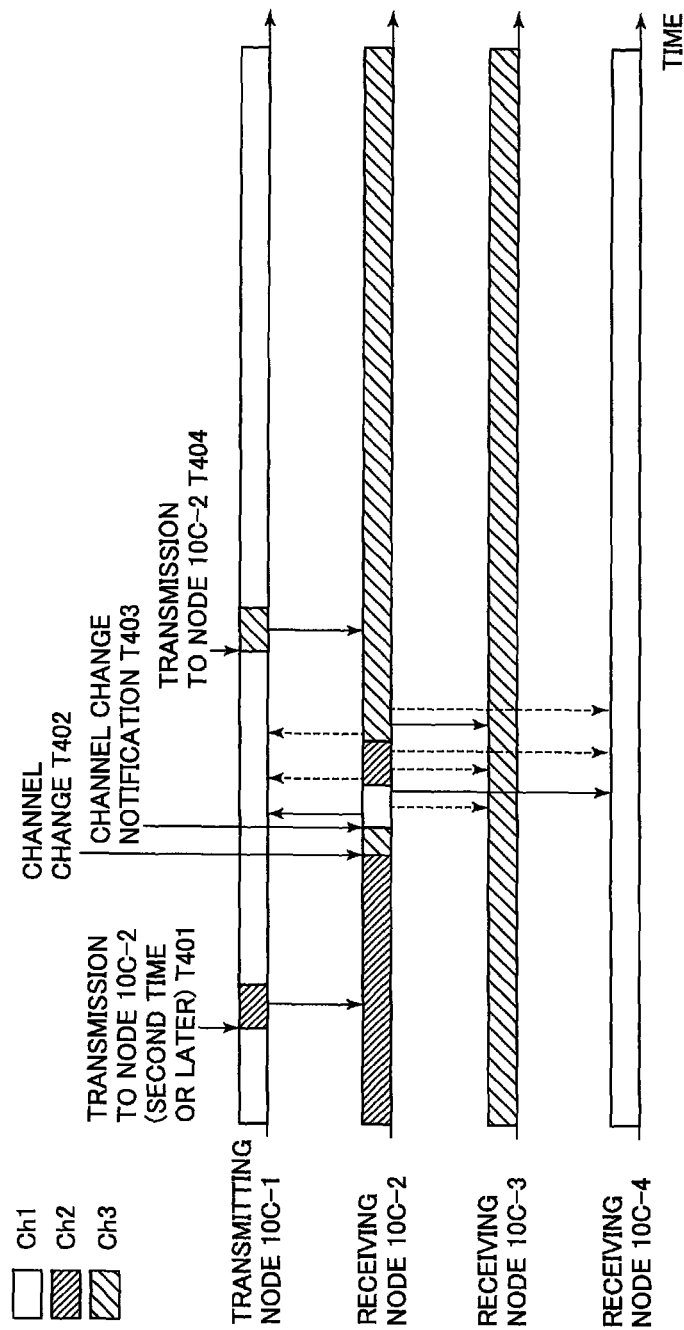

DEVICE, METHOD AND SYSTEM FOR WIRELESS COMMUNICATION ON A CHANNEL SELECTED FROM AN AVAILABLE-CHANNEL LIST

BACKGROUND OF THE INVENTION

Field of the Invention

The present invention relates to a device, a method and a system for wireless communication, which is applicable to, for example, a sensor network in which a plurality of spatially distributed wireless communication nodes wirelessly perform data communication with one another.

Description of the Background Art

In the past, as a scheme in which each wireless communication device communicates on plural radio channels, i.e. multi-channel communication, a solution is disclosed by Yosuke Tanigawa, et al., "Multi-Channel MAC Protocol Aggressive Use of Vacant Resources," Journal of IEICE (Institute of Electronics, Information and Communication Engineers) B, Vol. J92-B, No. 1, IEICE, published on Jan. 1, 2009, pp. 196-206.

According to Yosuke Tanigawa, et al., the communication method on multiple channels lies on the premise that channels are divided into one control channel and plural data channels, and in a normal reception-standby state, the control channel is used for a reception-standby operation. Specifically, a transmission source node transmits a control packet including information indicating a channel to be used in data communication over the control channel when data is generated. Then, a transmission destination node, when having received the control packet, transmits a response indicating that the control packet has been normally received to the transmission source node, and switches a channel to a designated channel. The transmission source node, when having received the response, communicates data over the data channel. When the communication is completed, both the transmission source and destination nodes wait for the reception using the control channel again.

In the communication method according to Yosuke Tanigawa, et al., the above-described procedure enables the communication over plural channels, and thus an effective reduction in interference and improvement on throughput can be expected. Further, there is an advantage that temporal synchronization between nodes is unnecessary in implementing this scheme.

However, according to Yosuke Tanigawa, et al., an in-advance sequence for notifying a transmission destination of a data channel is needed before data communication. Further, the in-advance sequence according to Yosuke Tanigawa, et al., is performed for each packet, and this causes a throughput to be lowered by an overhead of control packets, which is a problem. Furthermore, the communication method disclosed in Yosuke Tanigawa, et al., is provided in advance, and this leads a problem in that it is difficult to address interference on the control channel.

SUMMARY OF THE INVENTION

It is an object of the present invention to provide a device, a method and a system for wireless communication, which are capable of managing wireless communication channels to establish an efficient stable communication.

In accordance with one aspect of the present invention, a wireless communication device includes: a radio unit communicable by switching to select any one of a plurality of wireless communication channels; a channel list storage that stores a list of the plurality of wireless communication channels; a channel transmission controller that causes the radio unit to transmit a packet while switching a wireless communication channel on the basis of the list stored in the channel list storage; a channel search transmission controller that causes the radio unit to transmit the packet while switching the wireless communication channel on the basis of the list stored in the channel list storage until the packet is successfully transmitted; and a transmission control selector that selects either one of the channel transmission controller and the channel search transmission controller on the basis of a content of the packet of a transmission target and causes the selected one transmission controller to perform transmission control of the packet.

In accordance with another aspect of the present invention, a wireless communication method using a radio unit communicable by switching to select any one of a plurality of wireless communication channels includes: storing a list of the plurality of wireless communication channels in a channel list storage; causing, by a channel transmission controller, the radio unit to transmit a packet while switching a wireless communication channel on the basis of the list stored in the channel list storage; causing, by a channel search transmission controller, the radio unit to transmit the packet while switching the wireless communication channel on the basis of the list stored in the channel list storage until the packet is successfully transmitted; and selecting, by a transmission control selector, either one of the channel transmission controller and the channel search transmission controller on the basis of a content of the packet of a transmission target and causing selected transmission controller to perform transmission control of the packet.

In accordance with yet another aspect of the present invention, a wireless communication system includes a plurality of wireless communication devices, at least one of which is the wireless communication device set forth above.

According to the present invention, it is possible to provide a device, a method and a system for wireless communication capable of managing wireless communication channels so as to establish an efficient stable communication between wireless communication devices.

BRIEF DESCRIPTION OF THE DRAWINGS

The objects and features of the present invention will become more apparent from consideration of the following detailed description taken in conjunction with the accompanying drawings in which:

Figure 6:
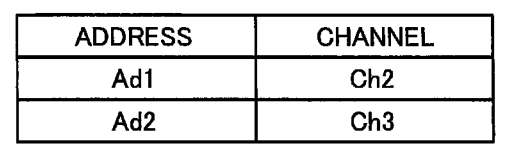

FIG. 6 explanatorily shows an exemplary configuration of an address-channel correspondence table according to the second embodiment;

FIG. 11 is a timing chart illustrating an exemplary operation of a wireless communication system according to the fourth embodiment.

DESCRIPTION OF THE PREFERRED EMBODIMENTS

With reference to FIGS. 1-4 of the accompanying drawings, a first embodiment of a system for wireless communication will be described in detail below. The present embodiment is directed to an application in which the wireless communication device according to the present invention is applied to telecommunications nodes wirelessly communicating with each other.

Figures 2, 3:
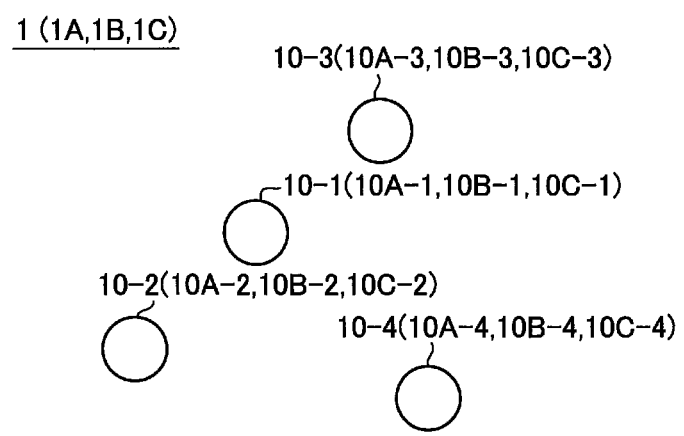
FIG. 2 schematically shows an overall configuration of a wireless communication system according to the first embodiment.
FIG. 3 explanatorily shows an exemplary configuration of a channel list stored in the node according to the first embodiment.

FIG. 2 schematically shows an overall configuration of a wireless communication system 1 according to the present embodiment. Note that, in FIG. 2, reference numerals in parentheses will commonly be used to the second, third and fourth embodiments which will be described later.

In the wireless communication system 1, four telecommunications nodes 10 (10-1 to 10-4) are arranged as illustrated in FIG. 2 as an example. For convenience of description and to facilitate understanding of the embodiment, it is assumed that the node 10-1 which is arranged as mainly directed to a packet transmission side and the three nodes 10-2 to 10-4 which are arranged as directed to a packet reception side. The specific number of nodes 10 arranged in the wireless communication system 1 is not limited. The present embodiment will be described on the premise that the nodes 10-1 to 10-4 have the same configuration, but some of the nodes may have a different configuration. In addition, each node can operate as packet transmission side and packet reception side.

The wireless communication system 1 may be, for example, a sensor network or the like, in which a plurality of spatially distributed wireless communication nodes wirelessly communicate data with one another. To the nodes 10, applied may be various kinds of telecommunications devices capable of performing wireless communication such as a sensor node in a sensor network, a cellular phone, a smartphone, a tablet computer, and a personal computer (PC).

In the following, the nodes 10-2 to 10-4 serving as the reception sides are assumed to have addresses Ad1, Ad2, and Ad3, respectively. Further, the present embodiment is adapted on the assumption that the nodes 10-1 to 10-4 are capable of switching a channel, or a communication band, for use in wireless communication to any one of channels Ch1 to Ch3, and capable of transmitting and receiving packets over the channel. It is also assumed that the wireless communication system 1 is a network according to an ad hoc scheme, on an ad hoc network using a multi-channel MAC (Media Access Control) protocol, in which packet transmission and a packet reception-standby operation are performed using any one of a plurality of channels, i.e. multi-channel communication, as described earlier. Moreover, it is assumed that the unit of data transferred between the nodes 10 in the wireless communication system 1 has an Ethernet (trademark) frame structure. The unit of data transferred between the nodes 10 in the wireless communication system 1 is herein referred to as a "packet". Further, it is assumed that MAC addresses are used in direction communication between the nodes 10. Although there are cases that a packet having an Ethernet frame format transferred between the nodes 10 includes an IP (Internet Protocol) packet inserted in the trailer of a packet, the present embodiment is basically adapted to, as an example, a network configuration of an MAC layer, and a detailed description on the network configuration of an IP layer is refrained from.

Next, an internal configuration of the node 10 will be described with reference to FIG. 1, which is a schematic block diagram illustrating a functional configuration of the node 10.

The node 10 includes a transmission mode selector 101, a transmission-on-all-channel controller 102, a channel search transmission controller 103, a radio unit 104, and a storage for storing data of a channel list 105, which are interconnected as depicted.

The node 10 can be implemented by installing a wireless communication program or the like according to the illustrative embodiments in a device having a configuration for executing the program, such as a CPU (Central Processor Unit), a ROM (Read-Only Memory), a RAM (Random Access Memory), an EEPROM (Electrically Erasable Programmable ROM), and a hard disk, and including an interface for wirelessly communicating with another communication device. Even in this case, the functions of the node 10 can be illustrated as shown in FIG. 1.

The transmission mode selector 101 selects a transmission mode based on, for example, header information of a packet to be transmitted, e.g. a packet supplied from an IP layer or upper layer than the IP layer such as an application layer, or the like, and sorts the packet, according to the selection, into a case in which the packet is transmitted through the transmission-on-all-channel controller 102 or a case in which the packet is transmitted through the channel search transmission controller 103. Hereinafter, a packet supplied to the transmission mode selector 101 from the upper layer or the like as a transmission target will be referred to as a "data packet 202".

The channel list 105 is a table listing channels on which the radio unit 104 transmits a packet. In the present embodiment, the channel list 105 is assumed to include content illustrated in FIG. 3. In the channel list 105, identifications of the channels Ch1, Ch2 and Ch3 are assumed to be registered in this order as illustrated in FIG. 3. Note that the channel list 105 is assumed to be set in advance so that the nodes 10 participating in the network of the wireless communication system 1 have the same value or information.

The transmission mode selector 101 selects any one transmission controller, such as the transmission-on-all-channel controller 102 or the channel search transmission controller 103 in the present embodiment, according to content, such as a destination address or a packet type, of a data packet 202 of a transmission target, and causes the selected transmission controller to perform transmission control of the data packet 202. Specifically, the transmission mode selector 101 supplies a data packet 204 whose destination address is a broadcast address (for example, a specific address such as FF:FF:FF:FF:FF:FF) to the transmission-on-all-channel controller 102. Further, the transmission mode selector 101 supplies a data packet 206 having a unicast address to the channel search transmission controller 103. However, in the present embodiment, the transmission mode selector 101 supplies a data packet 208, which has a unicast address but the protocol of which requires no arrival acknowledgement (ACK), i.e. no request of ACK, to the transmission-on-all-channel controller 102.

As to whether or not arrival acknowledgement is required, for example, when an IP header is set to a data packet of a transmission target (when an IP packet is inserted into a trailer), the transmission mode selector 101 may check whether or not the arrival acknowledgement is required, namely, presence or absence of the request of ACK, by referencing a protocol number in the IP header. For example, when a protocol which requires the arrival acknowledgement (presence of the request of ACK), such as a transmission control protocol (TCP) or an Internet control message protocol (ICMP), is set in the IP header of a data packet of a transmission target, the transmission mode selector 101 may determine that the arrival acknowledgement is required (presence of the request of ACK) for the data packet. Further, when a protocol which requires no arrival acknowledgement (absence of the request of ACK), such as a UDP, is set to the IP header of a data packet of a transmission target, the transmission mode selector 101 may determine that no arrival acknowledgement is required (absence of the request of ACK) for the data packet.

The transmission-on-all-channel controller 102 transmits the supplied data packet over all channels registered in the channel list 105. For example, when content of the channel list 105 is a list in which the channels Ch1, Ch2 and Ch3 are registered in this order as illustrated in FIG. 3, the transmission-on-all-channel controller 102 operates to first set the channel Ch1 as a channel to be used for wireless communication by the radio unit 104, and transmit the data packet 209 thereon. After the transmission-on-all-channel controller 102 waits until the transmission in the channel Ch1 is completed, then it sets the radio unit 104 to the channel Ch2 to transmit the same data packet again.

The order of channels used for data packet transmission by the transmission-on-all-channel controller 102 may be the same as the order of channels registered in the channel list 105, the order according to a transmission order schedule generated from the channel list 105, or the like. The transmission order schedule may be set by randomly setting a transmission order using channels in the channel list 105, or according to an order obtained by sorting channels by radio frequencies thereof, or the like.

The channel search transmission controller 103 sequentially transmits the supplied data packet over the channels registered in the channel list 105, as in the transmission-on-all-channel controller 102. However, the operation of the channel search transmission controller 103 is different from the operation of the transmission-on-all-channel controller 102 in that, when transmitting a data packet is successfully performed, in other words, when an ACK response is received from a transmission destination, transmission on a subsequent channel or channels is not performed. More specifically, the channel search transmission controller 103 selects a channel in the order based on the channel list 105 until an ACK response is received from the transmission destination, and sequentially transmits the supplied data packet. Hereinafter, processing of transmitting packets on different channels until an ACK response is received from a transmission destination as described above will be referred to as a "channel search transmission 210".

In the channel search transmission, when the size of a data packet is very large and a large number of channels are included in the channel list 105, it may be problematic that large size packets would be transmitted many times, which would result in an increase of an overhead.

In this regard, when the data amount of a supplied data packet is equal to or larger than a threshold value Th1, the channel search transmission controller 103 does not perform processing for the channel search transmission using the data packet as is. Instead, the channel search transmission controller 103 performs a channel search transmission aiming at searching for a communication channel available for transmission to a destination address, e.g. the address of the node 10, of the data packet, and then proceeds to transmitting the data packet on the communication channel thus searched for. The threshold value Th1 can be set to an arbitrary value.

More specifically, when the data amount of the supplied data packet is equal to or larger than the threshold value Th1, the channel search transmission controller 103 assembles an arbitrary unicast packet, or "search packet", to which a destination address, e.g. the address of the node 10, which is the same as the destination of the data packet is set, and performs the channel search transmission using the assembled packet. Then, the channel search transmission controller 103 transmits the data packet on a channel on which an ACK, i.e. ACK response, is received in the channel search transmission using the search packet.

The search packet is not limited to a specific configuration as long as the packet requires an ACK response (ACK), but the data amount of the search packet is less than the data amount of the supplied data packet or the threshold Th1, and it is desirable that the data amount is as small as possible. For example, a packet into which data of a certain pattern is inserted may be applied as the search packet, and each node 10 may be set to return an ACK when having received the search packet, and a packet of a protocol suitable for an existing communication test such as an ICMP ECHO may be used.

As described above, the channel search transmission controller 103 checks the size of the data packet of the transmission target, and performs the channel search transmission process directly using the data packet when the size of the data packet is smaller than the threshold value Th1. By contrast, when the packet size is equal to or larger than the threshold value Th1, the channel search transmission controller 103 can transmit the data packet after checking a channel corresponding to the destination address of the data packet by performing the channel search transmission using the search packet, for example, having the minimum amount of data. Thus, the channel search transmission controller 103 can perform an efficient channel search transmission.

The radio unit 104 changes a channel and transmits a packet 212 in response to a request from the components on its preceding stage, such as the transmission-on-all-channel controller 102 or the channel search transmission controller 103, and notifies the request source of completion thereof. Further, when a packet 214, for example, a control packet such as ACK, is received from another node 10, the radio unit 104 transfers the packet to the components on its preceding stage, such as the transmission-on-all-channel controller 102 or the channel search transmission controller 103, and the upper layer. The radio unit 104 is configured to switch a channel to any one of the channels registered in the channel list 105 and to wait for packet reception.

Next, an operation of the wireless communication system 1 having the above-described configuration according to the first embodiment will be described with reference to a timing chart shown in FIG. 4.

Figure 4:
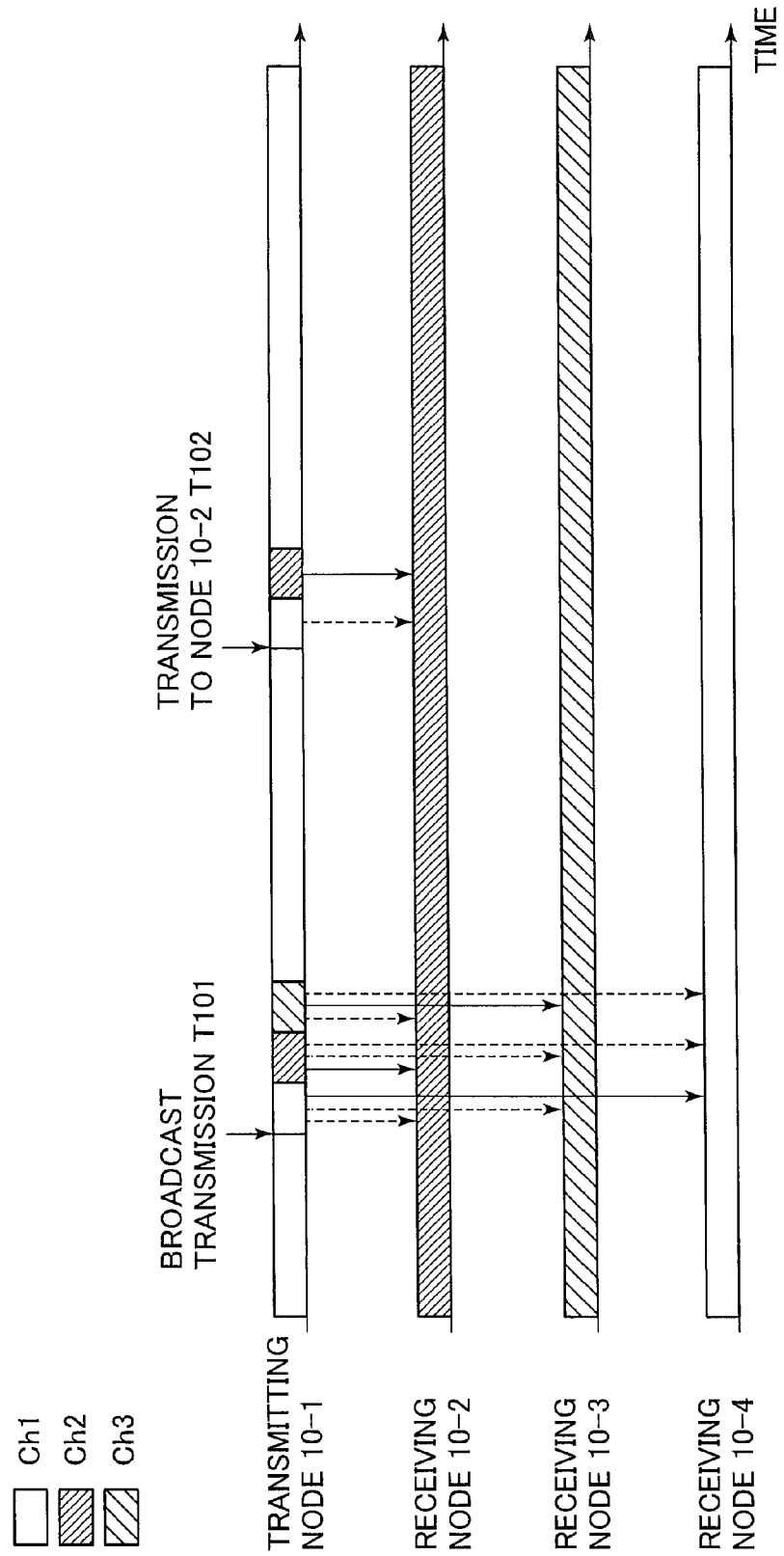
FIG. 4 is a timing chart illustrating an exemplary operation of the wireless communication system according to the first embodiment.

FIG. 4 illustrates an example in which the node 10-1 is a transmission side node, which transmits a broadcast data packet, and transmits a unicast data packet to the node 10-2.

The description will be made under the assumption that the nodes 10-2 to 10-4 wait for the reception on the channels Ch2, Ch3 and Ch1, respectively. It is assumed that the channels Ch1, Ch2 and Ch3 are set in the channel list 105 in advance, as illustrated in FIG. 3.

In the example shown in FIG. 4, at a timing T101, in the node 10-1, a broadcast data packet is supplied from the upper layer to the transmission mode selector 101. Thereafter, since the transmission destination of the packet is the broadcast address, the packet is transferred from the transmission mode selector 101 of the node 10-1 to the transmission-on-all-channel controller 102, and is transmitted through the transmission-on-all-channel controller 102. In this case, the transmission-on-all-channel controller 102 first transmits the data packet over the channel Ch1. This packet is received by the node 10-4 which waits for the reception in the channel Ch1 but not received by the nodes 10-2 and 10-3. Subsequently, the transmission-on-all-channel controller 102 of the node 10-1 causes the radio unit 104 to switch to the channel Ch2, and transmits the data packet thereon. In this transmission, the data packet is received by only the node 10-2 that has selected the channel Ch2 but not received by the other nodes. Then, the transmission-on-all-channel controller 102 of the node 10-1 similarly transmits the packet over the channel Ch3, and the packet is received by the node 10-3 that has selected the channel Ch3.

According to the above-described transmissions, the node 10-1 can transmit the data packet to all neighboring nodes, i.e. the nodes 10-2 to 10-4, in the broadcast manner.

In the example shown in FIG. 4, at a timing T102, in the node 10-1, a unicast data packet, that is, a data packet which requires an arrival acknowledgement, the destination of which is the node 10-2, is supplied from the upper layer to the transmission mode selector 101. Since the destination of the data packet which requires the arrival acknowledgement is a unicast address, the packet is transferred from the transmission mode selector 101 of the node 10-1 to the channel search transmission controller 103.

The channel search transmission controller 103 fixes a schedule so that the packet is transmitted in the order of the channels Ch1, Ch2 and Ch3, and first transmits the packet to the node 10-2 over the channel Ch1. However, since the node 10-2 waits for the reception on the channel Ch2, the node 10-2 does not receive the packet, and transmits no ACK response. When a waiting time for an ACK response from the node 10-2 expires, the node 10-1 changes or shifts the channel to the channel Ch2, and attempts to transmit the data, again. In this transmission, since the channel on the transmission source is identical to the channel on the transmission destination, the node 10-2 can receive the packet transmitted by the node 10-1, and the node 10-2 transmits the ACK response to the node 10-1. Thus, in this case, since the node 10-1 can receive the ACK response, the node 10-1 determines that the transmission has been completed, and thus the transmission processing is terminated without transmission on the channel Ch3.

In the example shown in FIG. 4, only three channels are set in the channel list 105. However, when the large number of channel is set, such a fixed transmission order (the order initially decided to be the channels Ch1, Ch2 and Ch3 in the above-described example) of a channel search transmission controller may cause a problem that a transmission cost for the last channel in the transmission order would increase. In such a case, the channel search transmission controller 103 can increase fairness, namely, reduce a deviation in usage to some channels, by applying randomness to the transmission order when deciding the transmission order.

Although not illustrated in FIG. 4, the ACK response packets transmitted from the nodes 10-2 to 10-4 on the reception side to the node 10-1 on the transmission side are transmitted, similarly to other types of packets, according to a scheme selected by the transmission mode selector 101, i.e. the scheme applied to the transmission-on-all-channel controller 102 or the channel search transmission controller 103 in the present embodiment. That is also the case with the second, third and fourth embodiments which will be described later.

According to the first embodiment, there are provided the following advantageous effects. The node 10-1 selectively uses two transmission sequences by the transmission-on-all-channel controller 102 and the channel search transmission controller 103 according to a destination of a packet. Thus, even when the node on the reception side waits for the reception in a different channel, a data packet can be transmitted to the node.

Further, in the wireless communication system 1, it is unnecessary to provide a dedicated channel for transmitting and receiving a control signal in advance as a condition for implementing data packet transmission from the node 10-1 on the transmission side to the nodes 10-2 to 10-4 on the reception side. Therefore, in the wireless communication system 1, the node 10 on the reception side can freely select a channel, which achieves an effect of improving the throughput resulting from avoiding interference and using a plurality of channels.

Next, with reference mainly to FIGS. 5, 6 and 7, a second embodiment of a wireless communication system will be described in detail below. The present embodiment is directed to an application in which the wireless communication device according to the present invention is applied to nodes wirelessly communicating with each other.

Figure 1:
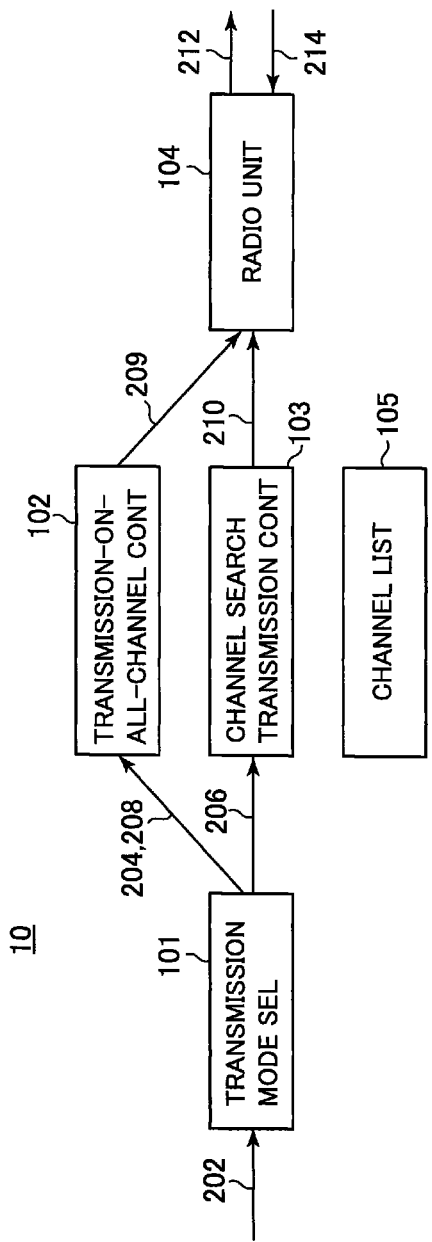
FIG. 1 is a schematic block diagram illustrating a functional configuration of a node according to a first embodiment.
Figure 5:
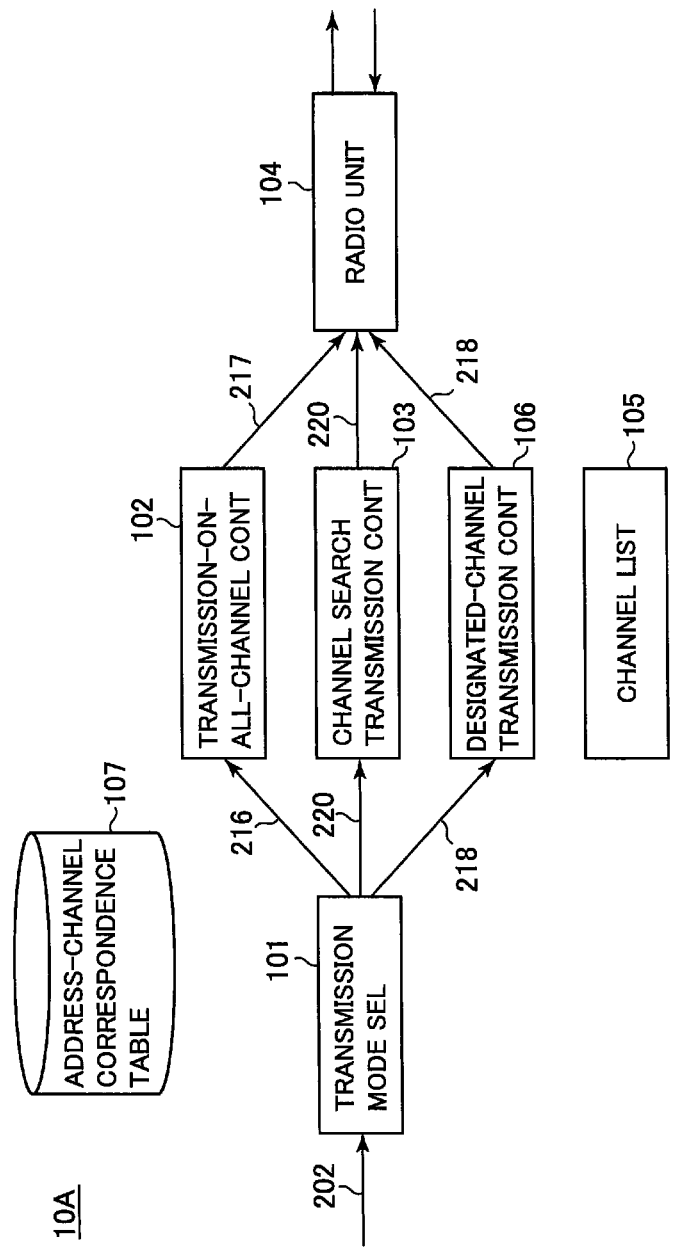
FIG. 5 is a schematic block diagram illustrating a functional configuration of a node according to a second embodiment.

In a wireless communication system 1A shown in FIG. 5, the nodes 10 shown in FIG. 1 are replaced with nodes 10A. A difference of the second embodiment from the first embodiment will be described below. In the wireless communication system 1A, the node 10A may be used at least on transmission side, and in addition to the node or nodes 10A the node or nodes 10 may be included.

FIG. 5 is a schematic block diagram illustrating a functional configuration of the node 10A configuring the wireless communication system 1A according to the second embodiment. Throughout the specification and accompanying drawings, like components are designated by the same or corresponding reference numerals.

The node 10A according to the second embodiment is different from the node 10 of the first embodiment in that a designated-channel transmission controller 106 and an address-channel correspondence table 107 are added, and the transmission mode selector 101 and the channel search transmission controller 103 include additional processes.

The transmission mode selector 101 according to the second embodiment transmits a data packet 217 through the transmission-on-all-channel controller 102 when a broadcast data packet 202 is supplied or when a unicast data packet 216 which does not require the arrival acknowledgement is supplied. Further, when a unicast data packet 222 which requires the arrival acknowledgement is supplied, the transmission mode selector 101 according to the second embodiment transmits a data packet 218 whose destination is present in an entry of the address-channel correspondence table 107 through the designated-channel transmission controller 106 according to channel information of the entry of the table, and transmits a data packet 220 whose destination is not present in entries of the address-channel correspondence table 107 through the channel search transmission controller 103.

In addition to the processing of the first embodiment, when a unicast data packet is successfully transmitted and an ACK response is received, the channel search transmission controller 103 stores the destination address of the packet and the channel on which transmission is successfully performed in the address-channel correspondence table 107 in association with each other.

The address-channel correspondence table 107 manages a combination of the address of each wireless node and the channel being used.

The address-channel correspondence table 107 is a table managing the combination of the address of each of other nodes 10A and its corresponding channel under use. The address-channel correspondence table 107 of the node 10A-1 is assumed to have content illustrated in FIG. 6. As illustrated in the figure, in the address-channel correspondence table 107, the address and the channel are managed for each of the nodes 10A-2 to 10A-4.

The designated-channel transmission controller 106 transmits a data packet 218 over a designated channel, i.e. a channel designated by the address-channel correspondence table 107. At this time, when an arrival acknowledgement is not received after transmission, an entry in the address-channel correspondence table 107 of the node 10A is determined to be incorrect, and in turn deleted.

In wireless transmission, however, a loss could occur due to a variation in a propagation environment even if channels on transmission and reception sides are identical to each other. For this reason, the designated-channel transmission controller 106 might inappropriately delete an entry by an adjustment of deleting an entry associated with the node 10A from the address-channel correspondence table 107 after transmission to the node 10A associated with the same entry fails a predetermined number of times or more. In order to avoid such a loss, the designated-channel transmission controller 106 may be adapted to prevent, when a radio wave condition gets worse during a short period of time, the entry from being deleted from the address-channel correspondence table 107. Note that the designated-channel transmission controller 106 may also be adapted not to check a reception of an acknowledge response and not delete an entry after transmitting a data packet which requires no ACK response. In addition, the designated-channel transmission controller 106 may be adapted such that, when an acknowledge response is not received after it has transmitted the data packet on the designated channel, the date packet may be transmitted again on other channels, for example, under the control of the channel search transmission controller 103.

Next, an operation of the wireless communication system 1 having the above-described configuration according to the second embodiment will be described with reference to a timing chart shown in FIG. 7. FIG. 7 illustrates an example in which the node 10A-1 is the transmitting node, and transmits data in unicast transmission to the node 10A-2 twice.

The description will be made under the assumption that the nodes 10A-2 to 10A-4 wait for the reception on the channels Ch2, Ch3 and Ch1, respectively. It is assumed that the channels Ch1, Ch2 and Ch3 are set in the channel list 105 in advance as illustrated in FIG. 3. As an initial state before the process shown in the timing chart shown in FIG. 7 starts, no entry is registered in the address-channel correspondence table 107.

Figure 7:
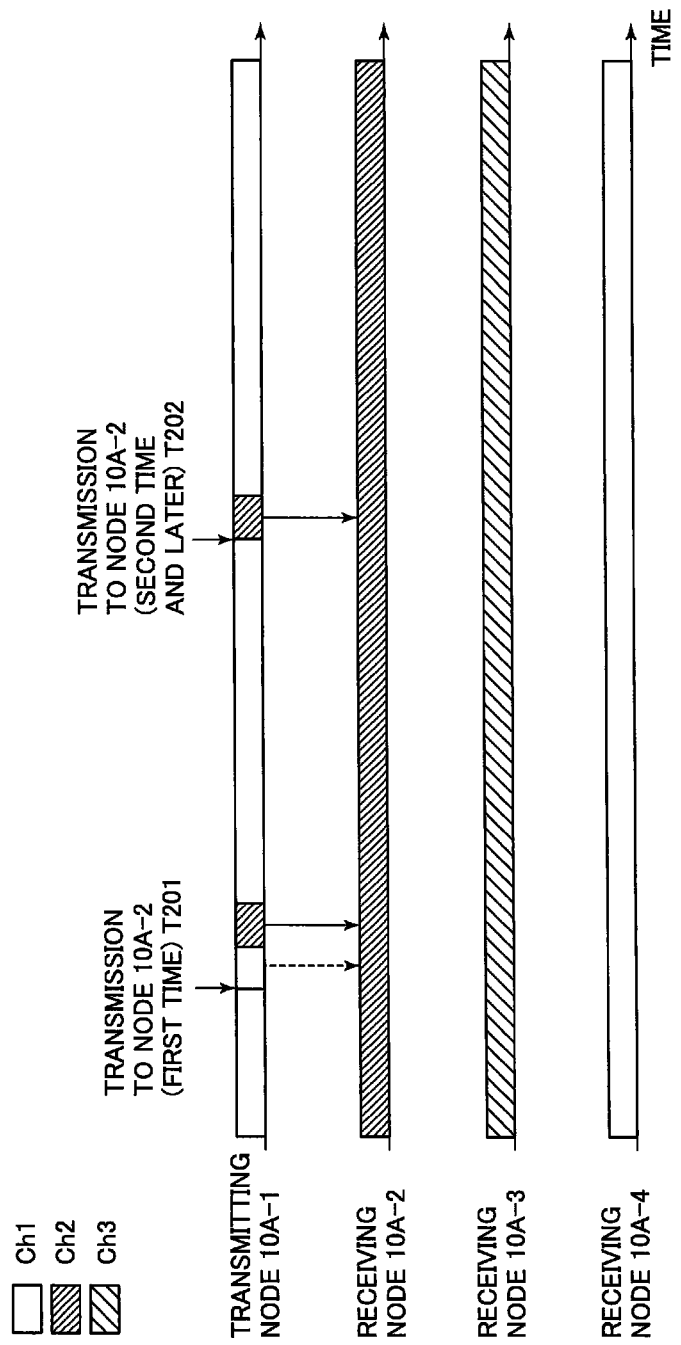
FIG. 7 is a timing chart illustrating an exemplary operation of a wireless communication system according to the second embodiment.

In the example shown in FIG. 7, first at timing T201 and timing T202, the node 10A-1 is supplied (first and second, respectively) with a data packet addressed to the node 10A-2 from the upper layer.

At the timing T201, when transmitting the first unicast packet addressed to the node 10A-2, since the destination of the data packet is a unicast address but there is no entry in the address-channel correspondence table 107, the transmission mode selector 101 of the node 10A-1 instructs the channel search transmission controller 103 to transmit the data packet.

Then, in this example, the channel search transmission controller 103 fixes a schedule so that the data packet is transmitted in the order of the channels Ch1, Ch2 and Ch3, and when transmission is performed over the channel Ch2, the transmission is successfully performed. In this case, since the transmission has been successfully performed, the channel search transmission controller 103 stores a set of the identifications of the node 10A-2 and the channel Ch2 in the address-channel correspondence table 107, and terminates the process.

Thereafter, at the timing T202, the node 10A-1 is supplied (second) with a unicast data packet addressed to the node 10A-2 from the upper layer.

At the timing T202, when receiving the second unicast packet addressed to the node 10A-2, the transmission mode selector 101 of the node 10A-1 searches for an entry in which the same destination as the data packet is stored with reference to the address-channel correspondence table 107. In this case, the transmission mode selector 101 is supplied with the unicast data packet addressed to the node 10A-2, and there is an entry in which the same destination as the data packet is stored, i.e. an entry indicating that the node 10A-2 is using the channel Ch2, in the address-channel correspondence table 107. Thus, the transmission mode selector 101 instructs the designated-channel transmission controller 106 to transmit the data packet over the channel Ch2.

Then, the designated-channel transmission controller 106 transmits a data packet, that is, unicast data packet transmission, over the channel Ch2 in response to the instruction given from the transmission mode selector 101. As described above, since the node 10A-2 waits for the reception in the channel Ch2, the node 10A-2 can receive the data packet from the node 10A-1.

According to the second embodiment, there are provided the following advantageous effects. In the wireless communication system 1A according to the second embodiment, the node 10A-1 on the transmission side can avoid unneeded transmission in the channel search transmission for a packet addressed to the node 10A on the reception side to which a transmission has been successfully performed once. It is thus possible to reduce an overhead in a unicast transmission and improve the throughput to be higher than the first embodiment.

Now, with reference mainly to FIGS. 8 and 9, a third first embodiment of a wireless communication system will be described in detail below. The present embodiment is directed to an application in which the wireless communication device according to the present invention is applied to nodes wirelessly communicating with each other.

The wireless communication system 1B according to the third embodiment is different from that of the second embodiment in that the nodes 10A are replaced with nodes 10B. A difference of the third embodiment from the second embodiment will be described below. In the wireless communication system 1B, the node 10B may be used at least on reception side, and in addition to the node or nodes 10B, the nodes 10A and/or 10 may be included.

Figure 8:
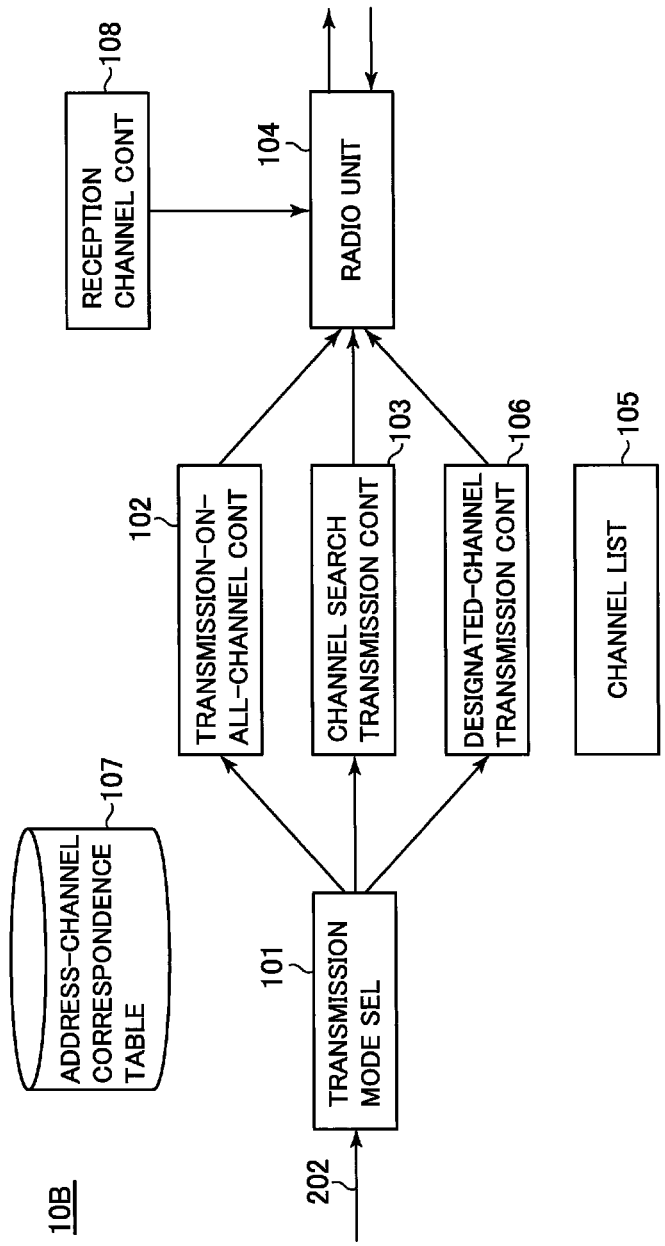
FIG. 8 is a schematic block diagram illustrating a functional configuration of a node according to a third embodiment.

FIG. 8 is a schematic block diagram illustrating a functional configuration of the node 10B configuring the wireless communication system 1B according to the third embodiment. The node 10B according to the third embodiment is different from that of the second embodiment in that a reception channel controller 108 is added.

The reception channel controller 108 changes a channel set to the radio unit 104, which may be referred to as a "reception-standby channel", according to a certain condition. For example, the reception channel controller 108 periodically scans a noise level of the available channels being used by the radio unit 104, and determines whether or not the reception-standby channel being used by the radio unit 104 is changed according to a scanning result. Examples in which the reception channel controller 108 changes the reception-standby channel includes, for example, when a noise level of the reception-standby channel currently used is higher than a previous noise level (for example, when the noise level is higher than the noise level obtained in a previous scan by a certain value or more), when the noise level of the reception-standby channel is higher than a noise level of another channel, when the noise level of the reception-standby channel is higher than a previously set threshold value, or when an instruction to change the reception-standby channel is given by processing of an upper layer.

When the reception channel controller 108 determines that the reception-standby channel is to be changed, the reception channel controller 108 may select a channel of a change destination, which may be referred to as a "change destination channel", using a method of randomly selecting a channel from the channel list 105 or a method of selecting a channel with the lowest noise level using a result of the channel scan and a process of measuring noise levels of respective channels based on the channel list 105.

Next, an operation of the wireless communication system 1B having the above-described configuration according to the third embodiment will be described with reference to a timing chart shown in FIG. 9.

Figure 9:
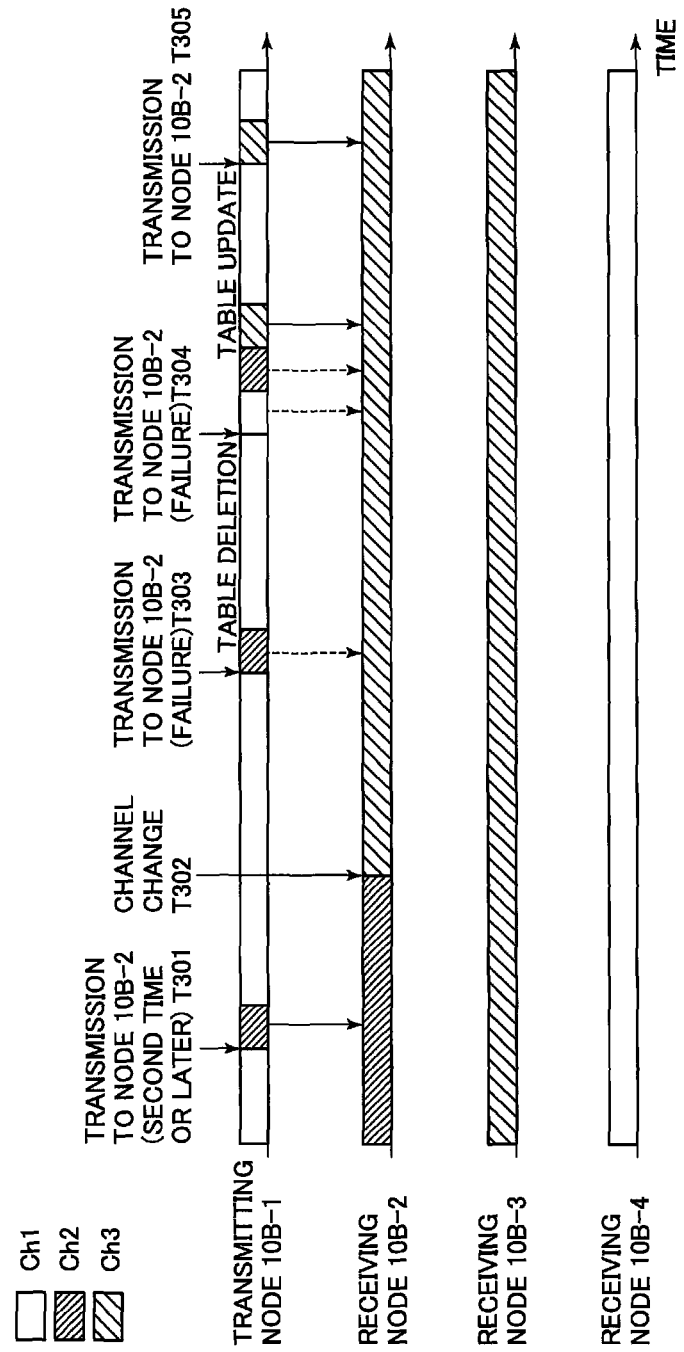
FIG. 9 is a timing chart illustrating an exemplary operation of a wireless communication system according to the third embodiment.

FIG. 9 illustrates an example in which the node 10B-1 transmits a unicast data packet to the node 10B-2 four times, i.e. at timings T301, T303, T304 and T305. The description will be made under the assumption that the nodes 10B-2 to 10B-4 wait for the reception over the channels Ch2, Ch3 and Ch1, respectively. It is assumed that the channels Ch1, Ch2 and Ch3 are set in the channel list 105 of each node 10B in advance as illustrated in FIG. 3. Further, it is assumed that the node 10B-1 has transmitted a packet to the node 10B-2 at timing before the timing T301 in the timing chart shown in FIG. 9, and therefore an entry indicating that the channel of the node 10B-2 is the channel Ch2 is presented in the address-channel correspondence table 107 of the node 10B-1. In the timing chart shown in FIG. 9, the node 10B-2 changes the reception-standby channel to the channel Ch3 at the timing T302 between first data packet transmission (timing T301) and second transmission (timing T303) by the node 10B-1. Furthermore, it is assumed that the node 10B-1 waits for the reception on the channel Ch1 when the packet transmission is not performed or when the standby operation for receiving an ACK response after packet transmission is not performed.

First, at the timing T301, the node 10B-1 transmits a unicast data packet to the node 10B-2, which is the first transmission in the drawing. At this time, since the entry, indicating the channel Ch2, associated with the node 10B-2 is presented in the address-channel correspondence table 107 of the node 10B-1, the node 10B-1 transmits the data packet over the channel Ch2 under the control of its designated-channel transmission controller 106. At this time, the node 10B-2 waits for the reception in the channel Ch2, and thus the transmission succeeds normally.

Next, in this example, at the timing T302, the reception channel controller 108 of the node 10B-2 changes the reception-standby channel to the channel Ch3 due to a degradation of the noise level in the channel Ch2 or the like.

Subsequently, at the timing T303, the node 10B-1 transmits a unicast data packet to the node 10B-2 again under the control of its designated-channel transmission controller 106, and at this time, since a combination of the node 10B-2 and the channel Ch2 has been registered in the address-channel correspondence table 107, the channel Ch2 is used for the transmission. However, since the reception-standby channel of the node 10B-2 has already been changed to the channel Ch3, the unicast data packet transmission to the node 10B-2 by the node 10B-1 at the timing T303 fails. At this time, since the transmission fails, the designated-channel transmission controller 106 of the node 10B-1 deletes the entry associated with the node 10B-2 from the address-channel correspondence table 107 in this example.

Thereafter, at the timing T304, a unicast data packet is transmitted from the node 10B-1 to the node 10B-2, which is the third transmission in the depicted example. At this time, in the node 10B-1, the entry associated with the node 10B-2 has been deleted from the address-channel correspondence table 107. Therefore, the transmission mode selector 101 of the node 10B-1 transmits the unicast data packet through the channel search transmission controller 103. At this time, in the node 10B-1, the channel search transmission controller 103 fails the transmission on the channels Ch1 and Ch2 in the channel search transmission. However, the channel Ch3 is identical to the reception channel of the node 10B-2, and therefore the transmission over the channel Ch3 succeeds. At this time, a set of the identifications of the node 10B-2 and the channel Ch3 is registered in the address-channel correspondence table 107.

Thereafter, at the timing T305, in other words, at the time of transmission from the node 10B-1 to the node 10B-2 which is the fourth transmission in the illustrative example, the entry of the address-channel correspondence table 107 has been updated to a correct one. Thus, the node 10B-1 transmits the unicast data packet to the node 10B-2 on the channel Ch3 under the control of its designated-channel transmission controller 106, and the transmission is normally completed.

According to the third embodiment, there are provided the following advantageous effects. In the wireless communication system 1B according to the third embodiment, since the reception channel controller 108 is added, the wireless node 10B on the reception side can autonomously change a channel being used to a channel with smaller interference, i.e. a channel suitable for communication, even when radio wave interference or the like is caused by another communication system. Further, even when the node 10B on the reception side changes the reception-standby channel, it is possible to maintain the connectivity of a link with a neighboring node.

Well, with reference mainly to FIGS. 10 and 11, a fourth embodiment of a wireless communication system will be described in detail below. The present embodiment is directed to an application in which the wireless communication device according to the present invention is applied to nodes wirelessly communicating with each other.

The wireless communication system 1C according to the fourth embodiment is different from that of the third embodiment in that the nodes 10B are replaced with nodes 10C. A difference of the fourth embodiment from the third embodiment will be described below. In the wireless communication system 1C, one or some of the nodes 10B may be replaced with the node or nodes 10C, and any one or ones of the nodes 10B, 10A and 10 may be included in addition to the node or nodes 10C.

Figure 10:
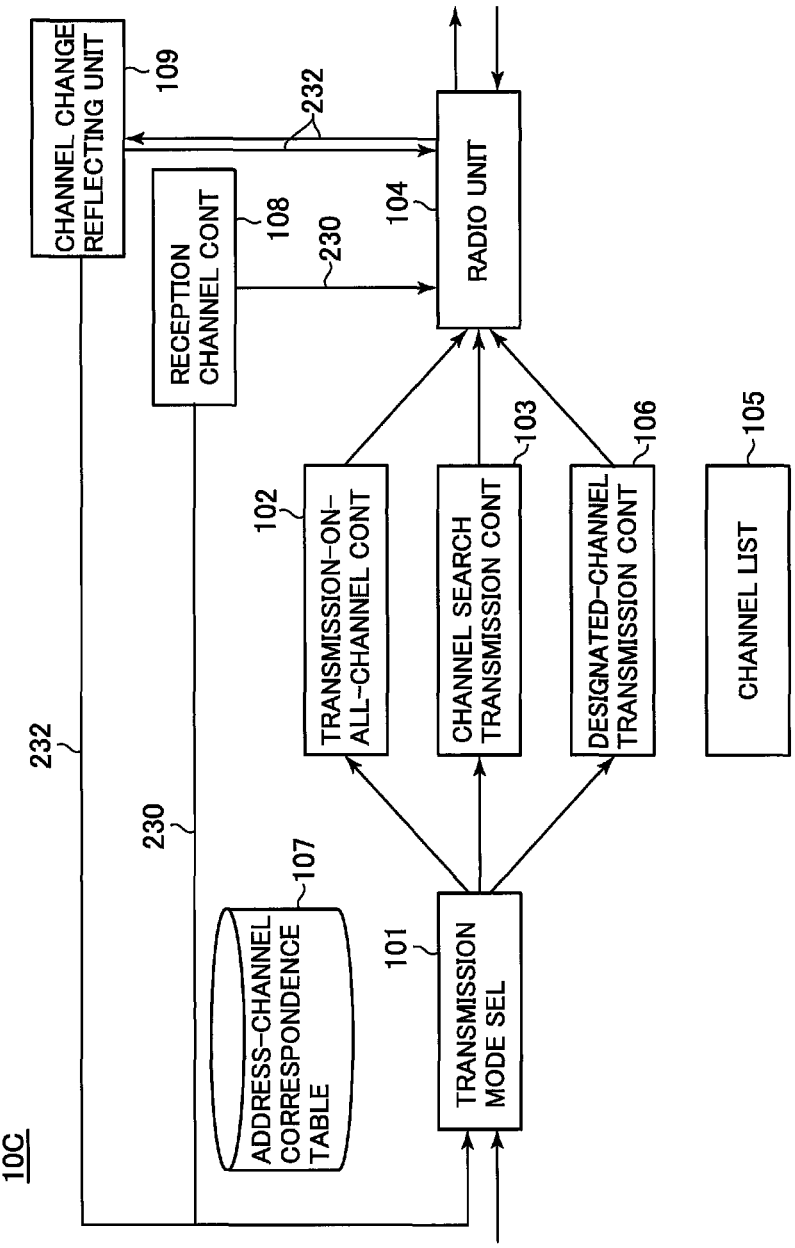
FIG. 10 is a schematic block diagram illustrating a functional configuration of a node according to a fourth embodiment.

FIG. 10 is a schematic block diagram illustrating a functional configuration of the node 10C configuring the wireless communication system 1C according to the fourth embodiment. The node 10C according to the fourth embodiment is different from that of the third embodiment in that a channel change applying section, or applier, 109 is added, and the reception channel controller 108 includes an additional operation.

The reception channel controller 108 proceeds to the processes in the following manner, in addition to those of the third embodiment. Specifically, when the reception-standby channel is changed, the reception channel controller 108 assembles a channel change packet 230 for notifying neighboring nodes of the fact that the reception-standby channel has been changed, supplies the channel change packet 230 to the transmission mode selector 101, and allows the transmission mode selector 101 to transmit the channel change packet 230. The channel change packet 230 can be assembled in the form of broadcast data packet. Thus, when the transmission mode selector 101 receives the channel change packet 230 as the data packet, the transmission mode selector 101 routs the channel change packet 230 to the transmission-on-all-channel controller 102 and allows the transmission-on-all-channel controller 102 to transmit the channel change packet 230 in the broadcast manner. As a result, the channel change packet 230 transmitted from a certain node 10 is transmitted to the neighboring nodes, and the neighboring nodes can recognize the reception-standby channel of that certain node.

When receiving the channel change packet 232 transmitted from any of the neighboring nodes through the radio unit 104, the channel change applying section 109 stores a combination of a transmission source address of the channel change packet 232 and the changed reception-standby channel in the address-channel correspondence table 107. Further, when the system is configured such that the reception-standby channel in the own wireless communication device, on which the change applying section 109 is installed, is to be changed so as to conform with the change in the reception-standby channel of the neighboring node, the channel change applying section 109 adaptively changes the reception-standby channel of the radio unit 104. At this time also, the channel change packet 230 will be transmitted through the reception channel controller 108.

Next, an operation of the wireless communication system 10 having the above configuration according to the fourth embodiment will be described with reference to a timing chart shown in FIG. 11.

FIG. 11 illustrates an example in which the node 10C-1 transmits a unicast data packet to the node 10C-2 twice (at timings T401 and T404). The description will be made under the assumption that, in an initial state of the timing chart shown in FIG. 11, the nodes 10C-2 to 10C-4 wait for the reception on the channels Ch2, Ch3 and Ch1, respectively.

Further, it is assumed that the channels Ch1, Ch2 and Ch3 are set in the channel list 105 in advance as illustrated in FIG. 3. Further, since the node 100-1 has transmitted a packet to the node 10C-2 at timing before the timing T401 in the timing chart shown in FIG. 11, and therefore an entry indicating that the channel of the node 10C-2 is the channel Ch2 is presented in the address-channel correspondence table 107 of the node 10C-1. In the timing chart shown in FIG. 11, the node 10C-2 changes the reception-standby channel to the channel Ch3 at the timing T402 between first and second data packet transmission in the illustrative example (timing T401 and T404) of the node 10C-1. Furthermore, it is assumed that the node 10C-1 waits for the reception on the channel Ch1 when the packet transmission is not performed or when the standby operation for receiving an ACK response after packet transmission is not performed. As described above, the timing chart shown in FIG. 11 illustrates an operation of the wireless communication system 1C according to the fourth embodiment under the initial condition substantially the same as the timing chart shown in FIG. 9 for use in describing the operation of the third embodiment.

First, at the timing T401, the node 10C-1 transmits a unicast data packet to the node 10C-2, which is the first transmission in the illustrative example. At this time, since the entry, indicating the channel Ch2, associated with the node 10C-2 is presented in the address-channel correspondence table 107 of the node 10C-1, the node 10C-1 transmits the data packet on the channel Ch2 under the control of its designated-channel transmission controller 106. At this time, the node 10C-2 waits for the reception on the channel Ch2, and thus the transmission succeeds normally.

Thereafter, in this example, at the timing T402, the reception channel controller 108 of the node 10C-2 changes or shifts the reception-standby channel of the node 10C-2 to the channel Ch3 due to a degradation of the noise level in the channel Ch2 or the like.

At the timing T403 following the reception-standby channel having been changed, the reception channel controller 108 of the node 10C-2 supplies the channel change packet 230 to the transmission mode selector 101 as a broadcast data packet, and allows the transmission mode selector 101 to transmit the channel change packet 230 in the broadcast manner.

At this time, since the channel change packet 230 is transmitted from the node 10C-2 in the broadcast manner, the channel change packet 230 is transmitted over all the channels, i.e. channels Ch1, Ch2 and Ch3, registered in the channel list 105. In this example, the channel change packet 230 of the node 10C-2 is delivered to the nodes 10C-1 and 10C-4 by the transmission over the channel Ch1, and delivered to the node 10C-3 by the transmission over the channel Ch3. The node 10C-1, when having received the channel change packet 230, causes the channel change applying section 109 (or the reception channel controller 108) to store a set of the identifications of the node 10-2 and the channel Ch3 in the address-channel correspondence table 107.

Thereafter, in this example, at the timing T404, the unicast data packet is transmitted to the node 10C-2. At this time, since the entry has already been updated to the channel Ch3 in the address-channel correspondence table 107 of the node 10C-1, the node 10C-1 can transmit a packet on the channel Ch3, and transmission from the node 10C-1 to the node 10C-2 is normally completed.

According to the fourth embodiment, there are provided the following advantageous effects. In the wireless communication system 1C, it is possible to prevent a transmission failure due to a mismatch between the channels recorded in the address-channel correspondence table 107 in the node 10C-1 on the transmission side and channels being actually used by the nodes 10C-2 to 10C-4 on the reception side, when the reception-standby channel has been changed in any of the nodes 10C-2 to 10C-4 on the reception side. Therefore, in the wireless communication system 1C, the packet arrival rate is improved. In addition, in the wireless communication system 1C, it is possible to efficiently change a channel by assembling a channel change packet so as to include information on a reason for changing the channel or the like.

The present invention is not limited to the above-described embodiments, and modified embodiments will be described below.

The fourth embodiment is directed to the example in which information on the changed reception-standby channel is added to the channel change packet, but any other information, for example, a change reason ID (identification) and a reception-standby channel before changing the change may be added.

For example, when each node detects radio wave interference, or a predetermined level of noise, and changes a reception-standby channel, the node may insert data indicating a change reason into the channel change packet by its reception channel controller. For example, a list of IDs each representative of a reason for changing a channel may be stored in the reception channel controller of the nodes, and one of the IDs corresponding to a change reason may be inserted to a channel change packet when the reception channel controller assembles the channel change packet.

Further, when the reception-standby channel before the channel change inserted into the channel change packet is identical to the reception-standby channel of its own wireless communication device, the node, when having received the channel change packet, can determine by its reception channel controller that radio wave interference is likely to affect its own wireless communication device of interest located near the transmission source of the channel change packet, and thus change the reception-standby channel. Thus, in the entire wireless communication system, it is possible to improve the efficiency of interference avoidance.

Further, in this case, when each node changes a reception-standby channel change of its own wireless communication device by its reception channel controller or channel change applying section in accordance with the change in a reception-standby channel of a neighboring node, and transmits a channel change packet, the node may insert an ID indicating that the channel has been changed according to the change in the channel of the neighboring node into the channel change packet as a change reason. Since the change reason of the reception-standby channel in each node is exchanged using an ID in this way in the wireless communication system, it is possible to prevent the channel change of the node from being unlimitedly propagated in the entire system.

Another modified embodiment will be described. The wireless communication devices according to the above-described embodiments are exemplarily configured merely for convenience of description such as to transfer packets of an Ethernet frame format, but such a specific structure of packets to be transferred may not be limited.

The entire disclosure of Japanese patent application No. 2013-266004 filed on Dec. 24, 2013, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A wireless communication device comprising:
a radio unit configured to communicate via radio signals, and communicable over any one of a plurality of wireless communication channels by switching to select any one of the plurality of wireless communication channels;
a channel list storage that stores a list of the plurality of wireless communication channels;
a channel transmission controller that causes the radio unit to switch a wireless communication channel to transmit a packet to each channel, sequentially, in the channel list storage regardless of whether the radio unit receives an acknowledge signal acknowledging receipt of the packet, such that the channel transmission controller transmits the packet to a first channel of the channel storage list, and based on completion of transmission of the packet to the first channel, transmits the packet to a next sequential channel of the channel list storage without waiting to receive an acknowledgement from the first channel;
a channel search transmission controller that causes the radio unit to switch the wireless communication channel to transmit the packet to each sequential channel in the channel list storage until the radio unit receives an acknowledge signal acknowledging receipt of the packet, and to stop transmitting the packet based on the radio unit receiving the acknowledge signal; and
a transmission control selector that selects either one of the channel transmission controller and the channel search transmission controller on the basis of a content of the packet of a transmission target, and causes the selected one transmission controller to perform transmission control of the packet,
wherein the transmission control selector selects the channel search transmission controller as the transmission target based on determining that the header of the packet has a unicast destination address and includes a protocol requiring an acknowledge requirement, and
the transmission control selector selects the channel transmission controller as the transmission target based on determining that the header of the packet has a unicast destination address and does not include a protocol requiring an acknowledge requirement.

2. The wireless communication device in accordance with in accordance with claim 1, further comprising:
a corresponding channel storage that stores, for each destination address, a wireless communication channel corresponding to the destination address; and
a designated-channel transmission controller that causes the radio unit to transmit the packet, a destination address of which is stored in the corresponding channel storage, over the wireless communication channel stored in the corresponding channel storage,
wherein the transmission control selector selects any one of the channel transmission controller, the channel search transmission controller and the designated-channel transmission controller on the basis of the content of the packet of the transmission target, and causes the selected one transmission controller to perform transmission control of the packet.

3. The wireless communication device in accordance with claim 2, wherein when the designated-channel transmission controller has failed to transmit the packet a predetermined number of times or more, the reception-standby channel controller deletes data associated with a destination address of the packet from the corresponding channel storage.

4. The wireless communication device in accordance with claim 1, further comprising a reception-standby channel controller that changes a wireless communication channel on which the radio unit waits for a reception according to a communication state of the radio unit.

5. The wireless communication device in accordance with claim 4, wherein when the wireless communication channel on which the radio unit waits for the reception is changed, the reception-standby channel controller assembles a channel change packet for notifying a neighboring wireless communication device of a changed wireless communication channel, and supplies the channel change packet to the transmission control selector as the packet of the transmission target.

6. The wireless communication device in accordance with claim 3, wherein when the channel change packet for notifying of a change in a wireless communication channel used to wait for a reception is received from another wireless communication device, the wireless communication device stores an address of a transmission source of the channel change packet and the changed wireless communication channel set in the channel change packet in the corresponding channel storage in association with each other.

7. The wireless communication device in accordance with claim 4, wherein when changing the wireless communication channel on which the radio unit waits for the reception, the reception-standby channel controller causes the radio unit to scan the plurality of wireless communication channels and decides a changed wireless communication channel on the basis of a result of the scan.

8. The wireless communication device in accordance with claim 1, wherein when a data size of the packet of the transmission target is equal to or larger than a predetermined value, the channel search transmission controller causes the radio unit to transmit a search packet for searching for a wireless communication channel corresponding to a destination address of the packet while switching the wireless communication channel until the search packet is successfully transmitted, and causes the radio unit to transmit the packet of the transmission target on the wireless communication channel on which the search packet has been successfully transmitted.

9. The wireless communication device in accordance with claim 1, wherein the channel transmission controller and the channel search transmission controller randomly decide an order of the wireless communication channels to be switched when causing the radio unit to transmit the packet while switching the wireless communication channel.

10. A wireless communication method using a radio unit configured to communicate via radio signals, and communicable over any one of a plurality of wireless communication channels by switching to select any one of a plurality of wireless communication channels, the wireless communication method comprising:
storing a list of the plurality of wireless communication channels in a channel list storage;
selecting, by a transmission control selector, either one of a channel transmission controller and a channel search transmission controller for transmitting a packet on the basis of a content of the packet of a transmission target, and causing the selected one transmission controller to perform transmission control of the packet,
wherein transmitting the packet by the channel transmission controller comprises switching the wireless communication channel by the radio unit to transmit the packet to each channel, sequentially, in the channel list storage regardless of whether the radio unit receives an acknowledge signal acknowledging receipt of the packet, such that the channel transmission controller transmits the packet to a first channel of the channel storage list, and based on completion of transmission of the packet to the first channel, transmits the packet to a next sequential channel of the channel list storage without waiting to receive an acknowledgement from the first channel, and
wherein transmitting the packet by the channel search transmission controller comprises switching the wireless communication channel by the radio unit to transmit the packet to each channel, sequentially, in the channel list storage until the radio unit receives an acknowledge signal acknowledging receipt of the packet, and to stop transmitting the packet based on the radio unit receiving the acknowledge signal,
wherein selecting either one of the channel transmission controller and the channel search transmission controller for transmitting the packet includes selecting the channel search transmission controller as the transmission target based on determining that the header of the packet has a unicast destination address and includes a protocol requiring an acknowledge requirement, and selecting the channel transmission controller as the transmission target based on determining that the header of the packet has a unicast destination address and does not include a protocol requiring an acknowledge requirement.

11. A wireless communication system comprising a plurality of wireless communication devices, wherein at least one of the plurality of wireless communication devices comprises:
a radio unit configured to communicate via radio signals, and communicable over any one of a plurality of wireless communication channels by switching to select any one of the plurality of wireless communication channels;
a channel list storage that stores a list of the plurality of wireless communication channels;
a channel transmission controller that causes the radio unit to switch a wireless communication channel to transmit a packet to each sequential channel in the channel list storage regardless of whether the radio unit receives an acknowledge signal acknowledging receipt of the packet, such that the channel transmission controller transmits the packet to a first channel of the channel storage list, and based on completion of transmission of the packet to the first channel, transmits the packet to a next sequential channel of the channel list storage without waiting to receive an acknowledgement from the first channel;
a channel search transmission controller that causes the radio unit to switch the wireless communication channel to transmit the packet to each sequential channel in the channel list storage until the radio unit receives an acknowledge signal acknowledging receipt of the packet, and to stop transmitting the packet based on the radio unit receiving the acknowledge signal; and
a transmission control selector that selects either one of the channel transmission controller and the channel search transmission controller on the basis of a content of the packet of a transmission target, and causes the selected one transmission controller to perform transmission control of the packet, wherein the transmission control selector selects the channel search transmission controller as the transmission target based on determining that the header of the packet has a unicast destination address and includes a protocol requiring an acknowledge requirement, and the transmission control selector selects the channel transmission controller as the transmission target based on determining that the header of the packet has a unicast destination address and does not include a protocol requiring an acknowledge requirement.

* * * * *